United States Patent [19]

Stone et al.

[11] Patent Number: 4,906,672

[45] Date of Patent: Mar. 6, 1990

[54] BLOWING AGENTS FOR POLYURETHANE FOAM

[75] Inventors: Herman Stone, Hazleton; Steve Lichvar, Drifton; Charles W. Bredbenner, Hazleton; Richard Rupp, Wapwallopen; Elmer Minnich, Hazleton, all of Pa.

[73] Assignee: PMC, Inc., Sun Valley, Calif.

[21] Appl. No.: 226,145

[22] Filed: Jul. 29, 1988

[51] Int. Cl.$^4$ ............................................. C08G 18/14
[52] U.S. Cl. ........................................ 521/130; 264/50
[58] Field of Search ......................... 521/130; 264/50

[56] References Cited

U.S. PATENT DOCUMENTS

| | | | |
|---|---|---|---|
| 904,003 | 2/1959 | Merriman | 521/130 |
| 3,108,976 | 10/1963 | Knox . | |
| 3,184,419 | 5/1965 | Merriman | 521/130 |
| 4,098,855 | 7/1978 | Fries | 264/50 |
| 4,275,172 | 6/1981 | Barth et al. | 521/112 |
| 4,284,728 | 8/1981 | Demou et al. | 521/155 |
| 4,288,564 | 9/1981 | Conover et al. | 521/122 |
| 4,312,820 | 1/1982 | Arnold et al. | 264/40.1 |
| 4,526,907 | 7/1985 | Thiele et al. | 521/133 |
| 4,783,295 | 11/1988 | Kearns et al. | 264/50 |

FOREIGN PATENT DOCUMENTS 647294 8/1962 Canada .
2628785 12/1977 Fed. Rep. of Germany .

OTHER PUBLICATIONS

European Patent Application No. 0145250, Willoughby, Improvements in Polyurethanes, 6/19/85.

Primary Examiner—Maurice J. Welsh
Assistant Examiner—Rabon Sergent
Attorney, Agent, or Firm—Davis Hoxie Faithfull & Hapgood

[57] ABSTRACT

Improved methods are provided for incorporating carbon dioxide and carbon dioxide generating compounds into polyurethane foam forming compositions as blowing agents to eliminate or reduce the amount of low boiling liquid auxiliary blowing agents, such as methylene chloride and chlorofluorocarbons conventionally used in the manufacture of urethane foams.

36 Claims, No Drawings

BLOWING AGENTS FOR POLYURETHANE FOAM

BACKGROUND OF THE INVENTION

1. Field of the Invention

This invention relates to methods and apparatus for the manufacture of flexible polyurethane foams by the essentially free rise, continuous casting method in which carbon dioxide from sources other than the reaction of water and free isocyanate is present in the gaseous state during the foam-forming reaction and contributes to the rise of the foam and lowering of the density of the foam product.

2. Discussion of the Prior Art

Polyurethane foams in general, and flexible foams specifically, use the reaction of isocyanates containing two or more isocyanate (NCO) groups with water to generate carbon dioxide gas. This gas is dispersed and retained to a large extent during the polymerization reaction and thus leads to the formation of foams. The polymerization reaction involves the reaction of additional isocyanate with a polymer that contains NCO reactive groups which are usually OH, but can also include $NH_2$, SH, COOH and others.

At the time the reaction is essentially complete the foam gels, i.e., becomes solid, and the cells are usually broken open by the heat of reaction and pressure of the trapped gases to produce the well known open cell structure of such flexible foams.

The many considerations relating to the selection of raw materials, catalysts, emulsifiers additives and mechanical conditions to produce a large variety of flexible foams exhibiting different physical properties are well established and known in the art.

The most critical of these properties is the control of density and firmness of foams for various end uses.

The density of the finished foam is controlled to a large extent by controlling the amount of gas generation, or "blowing" by $CO_2$ by adjusting the amount of water used in the formulation. However, it is well known that the reaction which generates $CO_2$ also produces urea linkages in the polymer which have the effect of making the foam firmer and more brittle. Therefore the density cannot be varied independently of the effect on other properties simply by addition of more water and isocyanate. Furthermore the reaction of water with isocyanates is highly exothermic and the heat generated can cause undesirable effects ranging from internal degradation, e.g., scorch, to decomposition and even combustion of the foam during the curing phase of the reaction.

To counteract some of these negative aspects so called "auxiliary blowing agents" have been used to produce foams of relatively low density. These are low boiling liquids which are converted to gases by the heat of the polymerization reactions. Since these gases are not incorporated into the polymer structure they do not cause firming or embrittlement. Furthermore, both the boiling of the liquid and subsequent expansion of the gas provide a heat sink to reduce the possibility of thermal degradation of the foam. Thus, if no auxiliary blowing agent is present in the reaction mixture, there is an upper limit on the amount of water that can safely be used in foaming reaction without risking scorching or more extreme thermal degradation.

The choices of liquids to serve this purpose, aside from economic considerations, are limited. The product must boil within a narrowly defined temperature range, be a nonsolvent for the foam, and have no catalytic activity or deleterious effect on the reaction. For obvious reasons, it is preferably nontoxic and nonflammable to avoid hazards in handling and due to emissions both within and outside the plant area. The auxiliary blowing agent should also not leave any residual odor in the foam.

Up to now the commercial blowing agents of choice have been low boiling chlorofluorocarbons (CFC's) such as dichlorodifluoromethane (R-12), trichlorofluoromethane (R-11) and similar products, as well as methylene chloride. The latter and R-11 have been the preferred auxiliary blowing agent for use in flexible foams.

Recently, the continued use of these auxiliary blowing agents has been questioned because of safety and environmental concerns. Methylene chloride is considered potentially toxic and possibly a low potency animal carcinogen, and exposure and allowed concentration in air is likely to be restricted severely thus making it impractical for the industry to continue its use. R-11 and similar CFC's are believed to be involved in potential destruction of ozone in the upper stratosphere with possible long term deleterious health and climatic effects.

There have been many attempts with other materials to achieve the same effects without use of the common auxiliary blowing agents. Because of the narrow range of properties for acceptable low boiling liquid blowing agents, none have been adopted commercially.

Various other methods have also been suggested in the art to eliminate or reduce the need for these commercial auxiliary blowing agents. One such alternative proposes the use of carbon monoxide produced by the decomposition of formic acid as an auxiliary blowing agent. This method has not found acceptance because formic acid is a highly corrosive product and the gaseous degradation product, carbon monoxide, is both highly toxic and flammable with a very wide range of explosive limit (12.5–74.2%) in air.

Another known method for lowering foam density involves pouring foam into molds or like containers which are placed in a sealed chamber. Reduction of atmospheric pressure within the chamber during the rise of the foam produces a finished product of reduced density without addition of gas producing constituents. Such treatment is difficult to control and is not applicable to the majority of commercial manufacturing facilities which produce continuous buns or blocks of flexible polyurethane foam.

Technology exists for producing stable emulsions of gases, including air, in rising foam. This frothing method requires use of pressurized foaming equipment and is not suitable for the preparation of low density and/or soft foams.

It has also been found that the presence of air and other dissolved gases in the foam-forming ingredients, before or during mixing results in the formation of bubbles and unacceptable holes in the cured foam product.

Other alternatives to the use of water and excess polyisocyanate, and CFC and other hydrocarbon blowing agents, which have been suggested include carbon dioxide among the sources of gaseous foam-forming compounds.

The desirability of using carbon dioxide as an auxiliary blowing agent to replace some or all of the water and/or conventional halogenated blowing agents currently in use is apparent, since such additions would not produce urea structures or heat and would not consume expensive isocyanate. Moreover, $CO_2$ also would not pose any problems of flammability and would decrease the level of toxic or possibly harmful effluents in the plant and atmosphere.

However, the simple addition of carbon dioxide in gaseous form as an added ingredient to the foam formulation at the mixing head is not effective. No measurable effect on either density or firmness is achieved. Several other methods have been proposed for introducing $CO_2$ into the foam-forming reactants.

For example, it has been suggested in U.S. Pat. No. 3,184,419 that liquified $CO_2$ be incorporated in a prepolymer mixture in an amount up to four percent by weight. The $CO_2$ is introduced into the prepolymer stream at 150 atmospheres pressure through an atomizing nozzle. The prepolymer containing $CO_2$ is fed to the mixer which is maintained at 300 psig. The use of high pressure in conventional mixing chambers is not desirable because of engineering problems. Moreover, there is no disclosure of how the $CO_2$ is maintained in the mixture once the pressure is reduced as the material is discharged from the mixer to atmospheric pressure. Also there is no indication of the effect of adding liquified low temperature $CO_2$ to the foam-forming mass. No data on the physical properties of the foam are provided by which the effect of the method on the density of the foam produced can be determined.

In U.S. Pat. No 4,284,728, addition of carbon dioxide is proposed as a stabilizer, i.e., to reduce the reactivity of reactive amines used as cross-linking agents in the foam forming reaction to produce high resilient, or HR, foams. A blend of polyol and diamine cross-linking agent is treated with $CO_2$, as by sparging, up to a concentration of 2.0 moles of $CO_2$ per equivalent of cross-linking agent. However, HR foams obtained using the $CO_2$ treatment exhibited a higher density, rather than a lower density, than those made without $CO_2$ treatment under comparable conditions.

An apparatus for use in the continuous manufacture of molded parts from flexible polyurethane foam which incorporates a finely divided stable gas dispersion in one of the foam forming components has been disclosed in U.S. Pat. No. 4,526,907. Among the inert gases suggested is $CO_2$. While the production of a stream containing macroscopic bubbles may be suitable for production of molded parts, the presence of preformed bubbles in the liquid foam-forming composition in the casting of flexible free rise foam is undesirable since it leads to unacceptable defects in the finished product.

It has also been suggested in EPO 145,250 that adducts of $CO_2$ can be prepared for use as additional blowing agents in polyurethane foam manufacture. The $CO_2$ adduct is produced by dissolving $CO_2$ in the polyol, either polyether or polyester, in the presence of at least one low molecular weight fluid, such as water, and certain amines and halocarbon blowing agents of the type customarily used in polyurethane foam production. These adducts are destabilized by reaction with the TDI thereby releasing the $CO_2$ as a gas in the foam-forming reaction mixture. The method disclosed was limited to the mixing and dissolution of solid and gaseous $CO_2$ in a pressurized vessel in a polyol that also contained water, trichlorofluoromethane, silicone, tin catalyst and an amine accelerator. While this method appears to permit the reduction of water and isocyanate in the foam-forming reaction, the quality of the final foam products are not fully disclosed. In one example, foam shrinkage was reported. Moreover, the method of incorporating the $CO_2$ by dissolution in the polyol component which also contains all of the other "low molecular weight fluids" which comprise the formulation can be a severe handicap under the actual operating conditions of the continuous manufacture of flexible foams where it is often necessary to make formulation adjustments on the fly, i.e., by changing the proportion of various component feedstreams entering the mix head.

The use of a $CO_2$ adduct is also disclosed in U.S. Pat. No. 4,735,970 in the preparation of rigid foams by the frothing process. The adduct is a reaction of $CO_2$ with specified amines containing at least one secondary amino group, no primary amino groups, and at least one primary or secondary hydroxyl group provided there are not more primary hydroxyl groups than amino groups, and optionally water. Although it is stated that the method can be employed in the manufacture of flexible and semirigid foams by block foaming and the laminator process, no examples are provided other than frothing of rigid foams.

It is therefore an object of this invention to provide methods for use in lowering the density of polyurethane foam products without the use of additional water-isocyanate reactions or auxiliary blowing agents which may be toxic or detrimental to the environment.

It is also an object of the invention to provide methods for reducing the density of polyurethane foams which will be (1) relatively simple and economical to practice; (2) readily adapted to meet changing conditions and formulations as required in the continuous commercial production of such foams; (3) adapted for use with variety of foams including rigid, semi-rigid and flexible, polyether and polyester polyols and polymer polyols, high resiliency foams, and to formulations that incorporate the usual additives, such as colors, plasticizer, fillers, combustion modifiers, and the like. Preferably, such methods should be readily adaptable to existing foam producing equipment.

It is another object of this invention to provide methods for reducing the density of such foams that also exhibit improved compression set and cell structure, that are free of holes caused by other dissolved gases.

It is a further object of the invention to provide a method of producing polyurethane foam of lower density having an improved curing pattern by eliminating or reducing the excessive cooling which accompanies the use of conventional auxiliary blowing agents.

The above objects, and others, have been met by the invention which is described below.

SUMMARY OF THE INVENTION

It has been found that carbon dioxide can be incorporated into the foam-forming reactants for release into rising foams in an effective manner which will significantly reduce density and will not cause undesirable firming and embrittlement of such foams.

In its broadest sense this invention includes dissolving the $CO_2$ in the ingredient(s) prior to their introduction into the mixing chamber used for producing the foam such that the $CO_2$ is retained in solution in the mixed liquid phase and is effective in lowering the density of the finished, cured product.

We have now found that one or more of the compounds in the formulation can be saturated with $CO_2$ gas and this gas is held sufficiently strongly in solution so as not to be released until such time as it can be retained in the expanding reactant mass and contribute to the cell structure of the final, stabilized foam product. The effect on the foam is to reduce density with only a slight decrease in the firmness or load-bearing ability of the foam. This result is contrary to the effect obtained from the $CO_2$ generated from TDI and water which produces the side effect of firming and lowers tensile properties, or to use of conventional auxiliary blowing agents which cause significant softening of the final foam product The saturation of ingredients can be carried out by static contact, i.e., by keeping the materials in contact with an atmosphere of $CO_2$ although this procedure tends to be slow. It can be done more efficiently by bubbling $CO_2$ into this liquid and letting the excess escape until an equilibrium is established. The entrainment of bubbles is to be avoided. Further improvement can be obtained by carrying out this process at greater than atmospheric pressure. Any of the foam ingredients can be used for this purpose but the ones present in the largest quantities and exhibiting the greatest solubility for CO2 are preferred in order to obtain the maximum reduction in density. The preferred components are:

A. Polyol—polyether, polyester or mixtures thereof;
B. Polyol with silicone emulsifier added;
C. TDI or other isocyanates which are suitable for production of foam;
D. Prepolymers, such as those made from various blends of polyol and isocyanate including those referred to as quasiprepolymers. The $CO_2$ can be added to a batch of the prepolymer which has already been prepared, or it can be added as the prepolymer is being made.

It is also contemplated by this invention to employ in the method modified polyols which exhibit enhanced solubility for $CO_2$. Such modified polyols have side chains, ACN, styrene or other constituents. The criteria for selection of such modified polyol are: to increase viscosity; and/or to facilitate the forming of adducts with $CO_2$; or to increase the solubility of $CO_2$ in the modified polyol, or a formulation of the modified polyol with other constituents.

Although introducing $CO_2$ into the foam mixing chamber has no effect on reducing the ultimate density of the foam, the $CO_2$ gas can be efficiently introduced at higher than atmospheric pressure at a point prior to the mixing chamber. This can be accomplished by injecting $CO_2$ into the component feedstream at a distance from the mix head which will permit the $CO_2$ to be dissolved to the maximum extent possible.

Pressures required are those needed to overcome the line pressure of the liquid ingredient. Higher pressures than that may be beneficial but are not required. Pressures involved may vary with equipment used and the process stream and may range from slightly above atmospheric to 2000 psi or higher. The preferred range is from about 75 about 900 psi.

Efficiency of the process is improved by introducing the gas as far from the mixing chamber as practical and by use of efficient dispersing nozzles such as those used for dispersing gases in liquids. One or more such nozzles may be used at one time, for example arranged peripherally about a line carrying the liquid. Additional in-line mixing such as use of a static mixer may be beneficial.

The introduction of $CO_2$ can be carried out before or after the metering equipment used for each component.

Excessive amounts of $CO_2$ are not detrimental since any gas not efficiently held in the liquid stream is released at the time of mixing and does not aid or hinder foam production.

Another embodiment of the invention includes methods for improving the efficiency of the process of incorporating $CO_2$ into the composition by addition of certain additives not usually used for the purpose of manufacturing polyurethane foam. These products have the property of maintaining the $CO_2$ in the mixed stream formed in the foam mixing chamber until the viscosity and temperature of the reacting foaming mass are such that release of the gas results in it being retained in the rising foam mass and producing the desired effect of lowering of the density of the finished cured foam.

Although this effect is obtained by choosing certain generic chemical structures particularly efficient in increasing solubility and retaining $CO_2$ gas in the foaming mass to achieve the desired effect, the specific preferred additives are usually low molecular weight products in order to minimize the addition of inert weight to the foaming mass.

Additives can be used either as a separate stream or in combination with one of the standard foam-forming ingredients such as the polyol component.

Additives particularly effective for the purpose of increasing the solubility of $CO_2$ in the reactants and maintaining $CO_2$ in solution until the foam begins to form include those containing functional groups with an affinity for $CO_2$ gas and not containing groups with a high degree of acidity or basicity which would interfere with the normal foaming process. The additives include:

A. Low molecular weight hydrocarbons particularly those containing highly unsaturated structures.
B. Oximes—including acetaldehyde-oxime, proprionaldehyde oxime, etc. This class also includes hydroxylamine precursor of oximes.
C. Aldehydes and ketones including acetone, methyl ethylketone and the like, and formaldehyde, acetaldehyde, paraformaldehyde and glyoxal.
D. Very weak acids such as boric acid or boric acid anhydride, carbonic acid, and the like, as well as those known as lactones.
E. Substantially neutral organic compounds containing both amine and acid groups such as amino acids or cyclic products such as those known as lactams.
F. Very weak bases, such as amines.

This invention further includes improvements in the efficiency of the utilization of such added $CO_2$ by novel variations in the mechanical conditions and chemical formulations used in the process for foam manufacture.

The critical features which determine the efficiency of the utilization of the gas employed in preparing polyurethane foams include the ability to retain the gas in solution during the very short term process of mixing the ingredients and maintaining the gas in solution until the viscosity of the polymer being formed is sufficient to retain the gas as an emulsion during the remainder of the time required to complete the polymerization reaction.

It is well known that addition of much greater than normal amounts of standard silicone fluid emulsifiers will reduce density of such foams by forming more efficient emulsions and by delaying the gel formation and eventual solidification of the rising foam. This approach by itself is often not practical because it results in poorer physical properties of the finished foam, and particularly air permeability and compression set. It is further known that lower densities can be achieved by delaying gel formation by increasing the amount of diisocyanate used (i.e., a higher index). This approach also generally produces poorer physical properties. It is not recommended for low density soft foams in the absence of, or with reduced amounts of auxiliary blowing agents because the additional heat generated by the excess isocyanate is likely to cause thermal degradation which produces a scorched appearance of the foam at the center of the block.

It has been found that the retention and utilization of added $CO_2$ gas, as disclosed elsewhere, can be increased significantly by either (1) reducing the rate at which it is released or, (2) by increasing the rate at which the viscosity of the rising foam mass is increased.

The first of these physical effects can be accomplished by greatly reducing the temperature of the initial mixture, and more particularly by reducing the temperature of the polyol used. Slight adjustments to increase the amount of silicone and catalyst are usually required to maintain the balance between foam and gel reactions but are well within normal adjustments carried out by skilled operators of commercial equipment.

Secondly, the rate of viscosity increase can be achieved by substantially increasing the temperature of the foaming mixture either by adding heat to one or more of the foaming components or by adding heat after the formulation mixture has been deposited on the conveyor. Such changes in temperature are usually accompanied by compensating adjustments to the formulation, such as reductions in amount of silicone and lower catalyst levels.

Preferred temperatures to maintain the $CO_2$ in solution are in the range of from 40° F. to 60° F., or lower, and to effect the rate of viscosity increase in the rising foam in the range of 90° F. to 110° F., or higher.

Further significant improvements in the efficiency of the utilization of dissolved $CO_2$ can be accomplished by appropriate selection of the raw materials used in the formulations and conditions used to control rate of rise and gel of the foam. For maximum efficiency in using dissolved gas in rising foam it is desirable to prevent escape of such gas, to generate maximum tolerable temperature and to delay solidification of the rising foams for as long as possible. Any one of these objectives can be reached by various formulation variables known to those skilled in the art, but each of these is usually accompanied by one or more undesirable effects on foam quality.

A process has now been found which allows for delaying gelation without increasing the temperature or decreasing the gas carrying capacity of the rising foam mass. The improvement consists in replacing at least part of the trifunctional polyol which is customarily used with selected difunctional polyols. Preferred diols are those which have minimum effect on physical properties of the foam such as those with a molecular weight ranging from about 800 to about 4000. Particularly preferred are diols which generate higher viscosity or increase the solubility of $CO_2$ gas such as those containing appreciable quantities of grafted side chains of styrene, acrylonitrile and similar products.

The usual effect of reducing functionality of the polyol can be at least partly overcome by adjusting the emulsifier and catalyst level of the formulation or by making other changes which are known to those skilled in the art.

A further improvement in the process of the invention to effectively reduce the density of the foam is accomplished by the addition to the foam formulation of materials with good solvent power for $CO_2$ and which have the characteristic of being able to decompose with generation of more $CO_2$.

Propylene carbonate has been suggested as an additive to polyurethane formulations with the advantage that it presumably inhibits undesirable thermal decomposition or "scorch". Although the mechanism for such action is not disclosed, it may at least partly depend on thermal decomposition of carbonate to propylene oxide which acts as an antioxidant or scavenger of degradation catalysts.

This decomposition process has also been utilized to produce $CO_2$ gas by addition of catalysts to accelerate the decomposition at slightly elevated temperatures during the early stages of foam formation. Such catalysts include acids or bases. Of particular interest are salts or porous fillers which may be used as a "carrier" for the organic carbonate and simultaneously act as a catalyst for relatively low temperature decomposition.

A further advantage of such additives is the fact that they in turn increase the solubility of $CO_2$ added to the mixture of polyol and carbonate and thus allow for further reduction of density.

Preferred organic carbonates are those of low molecular weight, and particularly propylene carbonate and ethylene carbonate, and their mixtures. Preferred decomposition catalysts are neutral salts which have no deleterious effects on foam making or the finished foam. Particularly preferred neutral salts are those of Mg, Ca, Al and elements from groups 2A, 3A, and 4A of the Periodic Table, as well as more complex organic products, i.e., alkaline earth metals, such as silicates, aluminates, clays etc., which can also act as absorbents for the reactive species.

Further improvements in the efficiency of utilization of such added $CO_2$ are obtained by addition of materials which rapidly and substantially increase the viscosity of one of the formulation ingredients and the initial foaming mixture to increase the solubility of $CO_2$ added to the solution.

It has been found that certain additives have the ability to materially increase the viscosity of the polyols conventionally used in producing polyurethane foams without themselves adding significant bulk to the foam. The combination in turn increases the solubility of the gaseous $CO_2$ and the ability to maintain it in solution until the polymerization reaction has proceeded sufficiently to hold the evolved $CO_2$ in the rising foam mass.

The additives which are most effective in achieving the desired effects include finely divided silica and silica gel and organic materials such as the so-called "super absorbents" as represented by starch grafted sodium polyacrylates, natural alginates, modified cellulose products and polyvinyl alcohol or acetates.

Other additives include nonionic derivatives of sugar such as polyethylene glycol 120 methyl glucose dioleate, a hydroxylethylated glucose ester, and similar compounds.

These products are added in proportion of about 1–10 parts per hundred parts of polyol to form thixotropic mixtures.

As shown above, the $CO_2$ can be introduced under pressure to increase its solubility in the major foaming ingredients such as TDI, polyol, etc. It has also been found that efficiency of use is increased if the pressure can be maintained as long as possible during, and immediately after, the major ingredients are mixed. This improves the ability of the mixture to retain the $CO_2$ gas in solution until the viscosity of the mix has increased sufficiently to trap the gas in the rising foam. For flexible foams using conventional manufacturing equipment the gas can be injected at several hundred pounds pressure. One practical limit is the pressure of the $CO_2$ which is available from conventional gas cylinders which is approximately 850 psi, or about 60 atm, when the tank is full.

In a further improvement of this method, liquid $CO_2$ is employed as a "supercritical fluid" and the outlet configuration of the mixing chamber is changed to allow for pressures sufficient to maintain this state. The "critical" temperature and pressure is defined as the condition under which the density of the liquid and gas states are equal. For $CO_2$ this is given as 31.1° C. (88° F.) and 72.9 atm (approx. 1073 psi). The critical solution temperature is that temperature above which two liquids are miscible in all proportions. It is well known that supercritical fluids such as $CO_2$ exhibit extremely high potency as solvents. Under the appropriate conditions of temperature and pressure, virtually unlimited amounts of $CO_2$ can be miscible with either TDI, polyol, or if desired even with some of the lower volume streams which would not ordinarily be considered.

This method has particular applicability to the manufacture of rigid and semirigid foam systems. Rigid foams are preferably "blow" not with $CO_2$, but with chlorofluorocarbons (CFC) such as trichlorofluoromethane (R-11), dichlorodifluoromethane (R-12), or mixtures thereof to take advantage of the very high insulating values achieved thereby. Many rigid foam applications do not require this property. These include packaging and certain void filling applications which add rigidity or sound deadening properties. Another application for products of this process includes sprayed-on roofing.

Carbon dioxide at supercritical conditions (above 90° F. and 1000 psi) is mixed with one or more of the foaming components and ejected under pressure such as in a piston mixer or a mixing spray gun with the $CO_2$ replacing all or part of the conventional blowing agents.

This method is also applicable to sprayed semiflexible or flexible foam systems including premixed two component systems.

DETAILED DESCRIPTION OF THE INVENTION

As noted above, the improved methods of this invention are to be practiced in the commercial-scale production of polyurethane foam products. Such foams are made by mixing a polyisocyanate, most commonly tolylene diisocyanate, or TDI, with a polyether or polyester polyol, a blowing agent which is commonly water, and at least one of each of a catalyst, or accelerator, a surfactant and emulsifier. Although variations in the temperature of the reactants, as well as the ambient temperature, pressure and relative humidity conditions of the production area can result in variations in physical properties, it can be assumed that a given formulation will produce foam having substantially the same characteristics from one run to another. Likewise, variations in physical properties of a given reactant are known to occur from batch to batch, even when obtained from the same supplier. However, for the purposes of practicing the methods of the invention disclosed herein, it is apparent that the reductions in density of the cured foam products when compared to the standard formulation is attributable to the methods of the invention.

Moreover, the experimental data indicates that the methods are broadly applicable to the wide variety of polyurethane foams commercially produced today, and to various types of commercial equipment currently in use.

Unless indicated otherwise, the examples which follow were run on a modified Henneke foam machine equipped with a pin type of mixer, or alternatively, an Admiral high pressure mix head which traversed above the pouring surface. The foam-forming reactants were discharged on an inclined, adjustable-speed conveyor which was set at a width of approximately 35 inches. Density measurements were based on samples of cured foam 12"×12"×2". Indentation Force Deflection (IFD) values were obtained in accordance with the ASTM Method D 3574-86 test method. Air permeability values were determined in accordance with Test G (air flow) of this ASTM, with all results reported in British rather than metric units.

The following abbreviations are used in the description which follows:

Units of Measurement
pcf—pounds per cubic foot (density)
cfm—cubic feet (of air) per minute (air permeability as measured by Test G of ASTM Method D 3574-86.)
cfh—cubic feet per hour.
phr—parts per hundred parts of polyol resin.
Polyether Polvols
3550—A polyether triol based on glycerine reacted with ethylene oxide and propylene oxide having a hydroxyl number of 48, (sold by Texaco or Arco as Thanol F 3550.)
15082—A polyether polyol blend of same type as Thanol F 3550 plus a glycerine-propylene oxide and a sucrose- ethylene oxide-propylene oxide type polyether, (sold by Dow Chemical as XUS 15082.00.)
3901—A polyether (polyoxyalkylene) polyol based on glycerine with a hydroxyl number of about 28, (sold by Mobay Chemical as Multranol 3901.)
3140—A polyether polyol having a hydroxyl number of 44 (sold by Dow Chemical.)
E646 A polymer polyol polyether containing grafted styrene acrylonitrile copolymer and homopolymer with a hydroxyl number of about 27, (sold by UCC as Niax Polyol E 646.)
1055—A polyether diol containing styrene copolymer and having a hydroxyl number of 66, (sold by BASF.)
Polyester Polyols
A variety of hydroxyl terminated polyesters based on glycerine, diethylene glycol and adipic acid.
Isocyanate
MF-192—A mixture of 2,4' and 4,4' diphenylmethane diisocyanate and higher molecular weight polymers with functionality of about 2.2 and having about 28% NCO content, (sold by Rubicon-ICI.)
TDI 80/20—A mixture of 2,4 and 2,6 tolylene diisocyanate in 80%–20% ratio.
Silicones
Q 25160—A polysiloxane, (sold by Dow Corning.)
Other
Niax A-1—Bis (2-dimethylamino ethyl) ether (70%) in a propylene glycol (30%), (sold by Union Carbide Corp.)
Dabco 33LV—Triethylene diamine (33%) in propylene glycol (67%), (sold by Air Products Chemicals Corp.)

C4—Stannous octoate (50%) in dioctylphthalate (50%), (sold by Witco Chemicals, Inc.)

C 232—An amine catalyst which is a blend of 3 parts of a mixture of bis (2-dimethylamino ethyl) ether (70%) and dipropylene glycol (30%) and 1 part of triethylene diamine (33%) and propylene glycol (67%).

T-10—A blend of 50% stanous octoate and 50% di(2-ethylhexyl) phthalate, (sold by Air Products.)

16 D—N-cetyl dimethylamine, (sold by Lonza.)

L 5307—A polyethylene oxide methylsiloxane copolymer, (sold by Union Carbide Corporation.)

UL 5—A blend of dibutyltin dilaurate in di(2-ethylhexyl phthalate) 50/50, (sold by Witco Chemical.)

DEOA—Diethanolamine (85%) water (15%)

DE 60F—A mixture of 80%-85% pentabromodiphenyloxide and 15%-20% of an aromatic phosphate plasticizer, (sold by Great Lakes Chemicals.)

Polycat—Trademark for tertiary aliphatic amine catalysts sold by Abbott Labs (now Air Products). Specific products will have a number after the trademark.

Glucamate DOE 120—Polyethylene glycol 120 methyl glucose dioleate, (sold by Amerchol, CPC International.)

Where the results reported refer to the preparation of hand batches, the following procedures were employed:

All ingredients, except TDI, were weighed and added to a cup and mixed. The preweighed TDI was then added to the other mixed ingredients in the cup, mixed for a few seconds, and poured into a paper lined metal mold measuring 8"×8" or 14"×14". Rise time was noted and the sample was placed in an oven for about ten minutes at about 150°-160° C. to reduce surface tack. The sample was allowed to cool after removal from the oven. The sample was removed from the mold, the paper stripped off and the foam was sectioned for further testing.

Unless otherwise specifically described or modified, a typical handbatch formulation used in the practice of the invention described in the specification is as follows:

| Component | Quantity (phr) |
|---|---|
| 3550 | 100 |
| TDI 80/20 | 56.5 |
| Index | 102 |
| Water | 5.0 |
| Q 25160 | 1.4 |
| A1/33LV 3:1 | 0.07 |
| C-4 | 0.5 |

In machine runs, as described in more detail below, a typical formulation useful in the practice of the invention is as follows:

| Component | Quantity (phr) |
|---|---|
| 3550 | 100 |
| TDI 80/20 | 56.54/102 |
| Q 25160 | 1.4 |
| T-10 | 0.5 |
| Water | 5 |
| C232/Polyol - 1:4 | 0.3 |

It will also be appreciated that all reactants exposed to the atmosphere will eventually reach an equilibrium state in which a finite quantity of atmospheric $CO_2$ is dissolved in the reactant. It should therefore be understood that by reference to standard, control or comparative formulations containing no dissolved $CO_2$ in the following examples, it is meant that no additional $CO_2$ has been injected or otherwise dissolved in the particular reactant or component feedstream in accordance with the method of the invention to increase the $CO_2$ concentration above that of the atmospheric equilibrium balance.

1. Effects of Dissolving $CO_2$ in Component Feedstreams

In the following examples, the polyol and isocyanate reactants were saturated with $CO_2$ by admitting $CO_2$ gas under pressure to tanks or containers equipped with stirrers. In each series, a comparative, control or standard, run was made using polyol or isocyanate from the same batch, but in which no excess $CO_2$ was dissolved. Where more than one example in a series contains $CO_2$, the contact time of the component with $CO_2$ was increased over that of the preceding example(s).

| Component | Example No. (*Indicates Hand Batch) | Density pcf |
|---|---|---|
| TDI 80/20 | | |
| No $CO_2$ | 1A | 1.16 |
| With $CO_2$ | 1B | 1.09 |
| | 1C | 1.08 |
| | 1D (overnite) | 1.07 |
| No $CO_2$ | *1E | 1.32 |
| With $CO_2$ | *1F | 1.28 |
| blanket | *1G | 1.23 |
| No $CO_2$ | *1H | 1.27 |
| With $CO_2$ (diffuser) | *1I | 1.23 |
| No $CO_2$ | *1J | 1.29 |
| With $CO_2$ | *1K | 1.26 |
| (diffuser) | *1L | 1.26 |
| No $CO_2$ | | 1.32 |
| With $CO_2$ | | 1.26 |
| No $CO_2$ | *1M | 1.25 |
| With $CO_2$ (2 days later) | *1N | 1.20 |
| No $CO_2$ | *1P | 1.30 |
| With $CO_2$ | *1Q | 1.24 |
| No $CO_2$ | *1R | 1.32 |
| With $CO_2$ | *1S | 1.26 |
| Polyol 3550 | | |
| No $CO_2$ | *1T | 1.32 |
| With $CO_2$ | *1U | 1.21 |
| | *1V | 1.19 |

In the following comparative examples, $CO_2$ from a cylinder was admitted through the polyol feed line at the mix head using a standard polyether formulation. Gauge pressure is reported.

| Component | Example No. | $CO_2$ Pressure psi | Density pcf |
|---|---|---|---|
| No $CO_2$ | 1X | 0 | 1.19 |
| With $CO_2$ | 1Y | 50 | 1.18 |

Although a foam of good quality was obtained, no significant reduction in density was observed.

In the following comparative examples, $CO_2$ was injected directly into the mixing head through a Bosch nozzle set at 250 psi into a standard polyether formulation.

| Example No. | $CO_2$ Rate psi | Density pcf |
|---|---|---|
| 1Z | 0 | 1.29 |
| 1AA | 1.2 | 1.33 |
| 1AB | 3.0 | 1.35 |
| 1AC | 1.2 | 1.33 |
| 1AD | 4.8 | 1.34 |
| 1AE | 8.4 | 1.35 |
| 1AF | 8.4 | 1.33 |

These results further indicate that injection of $CO_2$ gas into the mixing head under otherwise conventional operating conditions has no effect on reducing the density of the foam product.

2. Effects on Density of $CO_2$ Dissolved in Polyol, in TDI and in Polvol & TDI Components The following examples were prepared using a standard polyether polyurethane foam formulation in which $CO_2$ was dissolved in the polyol component and the TDI component at 25°±2° C.

| Example | | Density |
|---|---|---|
| 2A | No $CO_2$ | 1.32 |
| 2B | $CO_2$ in TDI | 1.30 |
| 2C | $CO_2$ in Polyol | 1.26 |
| 2D | $CO_2$ in TDI & Polyol | 1.25 |

This series of examples demonstrates the reduction in foam density which can be obtained when both the polyol and TDI components contain dissolved $CO_2$.

3. Effect of Addition of Silicone to Polyether Polvol

Using the same apparatus as described above, $CO_2$ was bubbled for several hours into a mixture of 1000 gm of 3140 polyether polyol and 14.0 gm of Q25160 silicone emulsifier maintained a temperature of 23°–24.5° C. A hand batch of the foam prepared using a standard formulation had a density of 1.28 pcf. A hand batch prepared from a polyol containing dissolved $CO_2$ had a density of 1.26 pcf. while the same formulation employing the polyol and silicone blend containing dissolved $CO_2$ had a density of 1.22 pcf. These examples demonstrate that the presence of a silicone emulsifier in the polyol at the time of treatment with $CO_2$ enhances the effect of reducing the density of the finished foam as compared to a polyether resin which contains no excess dissolved $CO_2$.

4. Effect on Density of $CO_2$ Dissolved in a Polyether Prepolymer

Using the apparatus previously described, $CO_2$ was bubbled into a prepolymer which had been prepared by adding 35.0 gm of TDI (80/20) to approximately 1000 gm of 3140 polyether polyol resin. $CO_2$ was added for several hours to the prepolymer which was at a temperature of 23°–26° C., without an observed increase in weight. When hand batches of foam were prepared, a minor reduction in density from 1.27 pcf for the control to 1.26 pcf, for foam prepared from the prepolymer products was observed. This indicates that the $CO_2$ is not readily soluble in the prepolymer component alone, and that a minimal reduction in foam density is observed in the preparation of hand batches by treatment or exposure of the prepolymer blend to gaseous $CO_2$ at ambient pressures.

5. Injection of Pressurized $CO_2$ Into Component Feedstreams

Apparatus was set up to permit the metered introduction of pressurized $CO_2$ into the component feedstream upstream of the mixer of a foam production line capable of continuously producing blocks having a width of up to thirty-five inches.

A one-quarter inch atomizing-nozzle, (manufactured by Spraying Systems, Model LNND 26 SS), was placed in the polyol feed line between the storage tank and the polyol pump. A steel tank containing $CO_2$ at an initial pressure of from 800 to 855 psi equipped with a regulator was attached through a flowmeter and a lance shut-off valve to the atomizing nozzle.

A similar set-up was employed to permit the injection of $CO_2$ into the TDI feed line through a T-fitting, except that a Circle Seal ® nozzle was incorporated into the line between the lance shut-off valve and the atomizing nozzle, and the $CO_2$ was injected downstream of the TDI pump. In accordance with the existing piping of components to the mix head, the TDI line was split into two high pressure lines, (300 psi Bosch nozzles), at opposite sides of the mixing head, and one low pressure nozzle. The low pressure feed line is equipped with a low pressure regulator valve and a flowmeter to permit adjustment of openness and cell size, in a manner which is well known to those familiar with the art.

In principle, in the practice of the invention it is desirable to maximize the relative volume fed through the high pressure nozzles to the mixing head to thereby maximize the volume of dissolved $CO_2$ entering the head in the TDI stream. Thus, the less TDI admitted through the low pressure valve, the more that will pass through the high pressure valve. However, it will be appreciated by those familiar with the art that adjustment and balancing of high and low pressure TDI flow rates are conventionally required in order to control and obtain optimum characteristics in the finished foam. It will also be understood that the pressure on the $CO_2$ feed system must be maintained in excess of the back pressure on the TDI line to insure that a sufficient volume of $CO_2$ is admitted to the line. Excess pressurization of the $CO_2$ system will be indicated by the presence of bubbles rising out of the liquid foam composition as it is discharged from the outlet of the mixing head on to the casting surface.

In order to maximize the contact between the gaseous $CO_2$ injected in the feedstream, static or in-line mixers can be employed downstream of the point of addition and prior to the mixing chamber.

6. Effect of Injection of $CO_2$ Into TDI Component Feedstream

Using a standard polyether polyol formulation without the injection of $CO_2$ into the TDI, a good quality control foam 6A was produced having a density of 1.32 pcf.

In three subsequent runs 6B, 6C and 6D, respectively, $CO_2$ was injected into the TDI feedstream at a rate which is sufficient to at least saturate the TDI while the volumetric flow of carbonated TDI via the low pressure line was varied from the maximum feed to essentially no TDI. All three runs produced good quality foam having density values of 1.26, 1.29 and 1.25 pcf, respectively.

This series of examples established that reductions in foam density employing the method of injecting $CO_2$ into the TDI component feedstream between the pump and the mixer were comparable to those attained by dissolving the $CO_2$ in the TDI while in the storage tank or container. It was also noted that each of the foam samples prepared from the TDI component containing $CO_2$ were of better quality than the standard sample, had an improved and finer cell structure and substantially increased air permeability.

7. Effect of Rate of Injection of $CO_2$ Into TDI Component Feedstream

Using the apparatus previously described, a series of samples were prepared to demonstrate the effect of increasing the amount of $CO_2$ injected into the TDI component feedstream.

Using a standard polyether polyol formulation without the injection of $CO_2$, a good quality foam 7A was produced having a density of 1.19 pcf and an air permeability of 2.0 cfm.

Employing the same polyether foam formulation, but varying quantities of injected $CO_2$ the following results were obtained:

| Example | $CO_2$ Rate (cfh) | Gauge Set | Density (pcf) | Permeability (cfm) |
|---|---|---|---|---|
| 7B | 1.55 | 12 | 1.13 | 0.9 |
| 7C | .65 | 6.5 | 1.14 | 0.9 |
| 7D | .55 | 6 | 1.14 | 1.1 |
| 7E | .55 | 6 | 1.15 | 1.3 |
| 7F | .12 | 3 | 1.16 | 1.3 |
| 7G | 1.55 | 12 | 1.11 | 0.9 |

These samples indicate the direct relationship between an increase in the rate of addition of $CO_2$ to the TDI component feedstream and the decrease in the density of the foam product.

8. Effect of Injecting $CO_2$ Into TDI Component Feedstream Containing Dissolved $CO_2$ Employing the apparatus previously described and a polyether formulation containing 5.2 phr of water and 58.51 phr of TDI, but without $CO_2$, foam of good quality, Ex. 8A, was produced having a density of 1.13 pcf.

Employing the same polyether formulation but using TDI from a 60 gallon storage tank containing dissolved $CO_2$ a good foam, Ex. 8B, was obtained having a density of 1.07 pcf.

In a third run, the TDI with dissolved $CO_2$ from the same tank was used, and $CO_2$ was also injected into the TDI feed line at a low flow rate. A good quality foam, Ex. 8C, was obtained having a density of 1.03 pcf.

These examples demonstrate that a further decrease in density can be attained by injecting CO2 into a feedstream of TDI that already contains dissolved $CO_2$.

9. Effect of Formulation Change (Increased Water) and Change in Rate of Injection of $CO_2$ Into TDI Component Feedstream Using the apparatus previously described and a standard polyether formulation having an increased quantity of water (5.2 vs. 5.0 phr) and increased TDI (58.51 vs. 56.54 phr) as compared to those previously described, but without injection of $CO_2$, a good quality foam, Ex. 9A, was produced having a density of 1.16 pcf. Employing the same polyether foam formulation, but varying quantities of injected $CO_2$, the following results were obtained:

| Example | $CO_2$ Rate (cfh) | TDI LP Set | Density (Pcf) | Permeability (cfm) |
|---|---|---|---|---|
| 9B | 1.95 | 30 | 1.08 | 1.1 |
| 9C | 1.05 | 15 | 1.10 | 1.7 |
| 9D | .90 | 5 | 1.10 | 1.6 |
| 9E | .55 | 0 | 1.11 | 2.3 |

These examples establish the existence of a direct relationship between the decrease in the rate of addition of $CO_2$ and the increase in density among different polyether formulations.

A further modification to the polyether formulation was made to employ 5.2 phr water and 60.01 phr TDI (index 104) to produce a good quality foam, Ex. 9F, having a density of 1.14 pcf.

In two subsequent runs using the same formulation and substantially the same operating conditions, but with the injection of $CO_2$ into the TDI component feedstream, good quality foams, Ex. 9G and 9H, were obtained, both having a density of 1.07 pcf.

The quantity or rate of $CO_2$ injected in the feedstream of the TDI and/or polyol component is adjusted to optimize the density reduction of the finished foam product, while maintaining the other aspects of foam quality. For example, excessive $CO_2$ can result in splashing of the foam-forming mixture as it is deposited on the casting surface. This condition can be alleviated by varying the mechanical restrictions and devices used to lay down the foam, and by adjusting the rate at which $CO_2$ is added to one or more of the component streams.

As is always the case, the visual observation of the condition of the foam-forming reactants and of the rising foam by the operator skilled in the art must be relied upon to adjust not only the $CO_2$ injection rate, but the other chemical and mechanical conditions as well, in order to maintain overall foam quality.

Employing the same formulation used in Examples 9A through 9H, the Henneke mixer was replaced with a mixer manufactured by Admiral Equipment Company that is characterized by high pressure and high shear and low residence time of the foam-forming composition in the mixing chamber. A comparative control having the same formulation as Ex. 9A and without $CO_2$ added to the feedstreams produced a good quality foam, Ex. 9J, having a density of 1.14 pcf. Employing the same polyether foam formulation, but varying quantities of injected $CO_2$, the following results were obtained:

| Example | $CO_2$ Rate (cfh) | TDI LP SET | Density (pcf) |
|---|---|---|---|
| 9K | 1.95 | 30 | 1.09 |
| 9L | .55 | 0 | 1.09 |
| 9M | .55 | 0 | 1.08 |
| 9N | 1.45 | 20 | 1.10 |
| 9P | .55 | 0 | 1.07 |
| 9Q | .55 | 0 | 1.05 |

In Ex. 9M additional $CO_2$ was injected with the silicone component Q25160, and in Ex. 9N the $CO_2$ was injected with the water.

In Ex. 9P and 9Q the formulation was modified by increasing the silicone component to 2.2 phr.

This series of examples demonstrates that a reduction in foam density can be achieved when using a high pressure/low residence time mixing chamber, and that reductions in density are attainable by injecting $CO_2$ gas into the silicone component feedstream.

10. Effect of Temperature Change on TDI Containing Dissolved $CO_2$

Employing the Henneke apparatus previously described and a polyether formulation containing 5.2 phr water and 58.51 phr TDI good foam was produced without and with $CO_2$ dissolved in the TDI component feedstream at the temperatures, and with the results indicated:

| Temperature | Density (pcf) | |
| --- | --- | --- |
| | No $CO_2$ | With $CO_2$ |
| 68° F./20° C. | 1.18 Ex. 10A | 1.12 Ex. 10B |
| 72° F./22.2° C. | 1.13 Ex. 10C | 1.08 Ex. 10D |

These examples demonstrate that the use of a TDI component containing dissolved $CO_2$ produces the desired effect of reducing foam density within a conventional range of operating temperatures.

11. Effect of Formulation Change (Increased Water) and Injection of $CO_2$ Into TDI Component Feedstream Using the Henneke apparatus previously described and a standard polyether formulation having an increased quantity of water (5.2 vs. 5.0 phr) and increased TDI (58.51 vs. 56.54 phr) as compared to those previously described, foam, Ex. 11A of good quality was produced which had a density of 1.14 pcf. Two subsequent runs, Ex. 11B and 11C, were made employing essentially the same formulation, except that $CO_2$ was injected into the TDI component feedstream, both at the same rate. The resultant foam from both runs was of good quality and both samples exhibited a density of 1.08 pcf.

These results demonstrate that a proportional reduction in foam density with injection of $CO_2$ in the TDI component feedstream is obtained with corresponding changes in formulations designed to produce lower densities by increasing the amount of TDI and water as blowing agent.

12. Effect of Injecting $CO_2$ Into Polyether Polyol Component Feedstream Before and After Pump Using the apparatus described above and a polyether formulation containing 5.2 phr TDI, foam of good quality, Ex. 12A, was made having a density of 1.20 pcf.

Using the same formulation and essentially the same conditions, $CO_2$ was injected into the polyol line upstream of the feed pump. While small reductions in density of the cured foam to 1.17 and 1.18 pcf. in Ex. 12B, 12C were observed, when the CO2 flow rate was increased to 1.55 cfh in Ex. 12D cavitation in the pump was observed with a drop in polyol flow rate, and no decrease in density.

In two subsequent examples, the same formulation was employed, except that the TDI contained dissolved $CO_2$; in addition, $CO_2$ was injected into the polyol feed stream after the pump and before the mixing chamber. The density of the cured foam was 1.10 pcf for Ex. 12E, and 1.11 pcf for Ex. 12F, respectively.

These examples demonstrate that a greater density reduction can be obtained if the gaseous $CO_2$ is injected into the component line downstream of the feed pump.

13. Effect of Injection of $CO_2$ Into Polyether Polyol Component Feedstream and Formulation Changes (Silicone & Catalyst)

Employing the apparatus previously described and a polyether formulations containing 5.2 phr water and 58.87 phr TDI, and 1.4 phr of a silicone surfactant (Q25160), but without $CO_2$, a good quality foam, Ex. 13A, is produced having a density of 1.16 pcf.

In a second run, the above formulation is modified by reducing the silicone level to 0.8 phr, the C232 catalyst is eliminated and a tertiary aliphatic amine catalyst such as Polycat 12 from Air Products is added. In addition, $CO_2$ is injected into the polyol feedstream between the pump and the mixing head and TDI containing dissolved $CO_2$ is pumped from a storage tank. A good quality foam, Ex. 13B, is obtained having a density of 1.10 pcf.

Another standard polyether formulation was prepared employing a polyether (polyoxyalkylene) polyol based on glycerine, (such as Multranol ® 3901 sold by Mobay Chemical), which produced a control foam Ex. 13C having a density of 1.32 pcf.

Using the same formulation, but with TDI containing dissolved $CO_2$ from a storage tank and $CO_2$ injected into the polyol feedstream a foam of comparable quality Ex. 13D was obtained having a density of 1.25 pcf.

In a third run the level of tin catalyst was reduced by 50%, again producing a foam of comparable quality Ex. 13E, but with a density of 1.28 pcf. It should be noted that this change in formulation improved the openness of the foam, as determined by air permeability measured at 1.2 cfm as compared to 0.9 cfm for the control Ex. 13C. This is significant, since such formulation changes to improve openness usually are accompanied by an increase in density.

14. Effect of Injection of $CO_2$ Into MDI Component Feedstream in Polyether Foam The following foam formulation employing MDI as the isocyanate was used on the Henneke apparatus described above to prepare a polyether product Ex. 14A of acceptable quality having a density of 2.55 pcf:

| Component | Amount (phr) |
| --- | --- |
| E-3901 | 100 |
| MF-192 | 53.59/100 |
| L-5307 | 0.4 |
| $H_2O$ | 2.7 |
| C-232/polyol (1:1) | 1.2 |

Using the same formulation and operating conditions except that $CO_2$ was injected into the MDI component feedstream between the pump and mix head at a line pressure of 350 psi, an acceptable foam Ex. 14B was obtained which had a density of 2.44 pcf. This foam was somewhat firmer than that of the standard run, and exhibited a higher air permeability value, (0.5 vs. 0.3 for Ex. 14A), indicating that it contained more open cells.

15. Effect of $CO_2$ Injection in Graft Polymer Polyol Component Feedstream

A graft polymer polyol of the polyether type containing grafted styrene acrylonitrile was employed in the following control formulation without added $CO_2$ to produce a good quality foam, Ex. 15A, with a medium density of 1.67 pcf.

| Component | Amount (phr) |
| --- | --- |
| E 646 | 90 |
| 15082 | 10 |
| TDI - 80/20 | 44.98/110 |
| Q 2510 | 0.9 |
| T-10 | .275 |
| GO2P/polyol - 1:2 | 2.7 |
| H₂O | 3.5 |
| C232/polyol - 1:4 | 0.2 |
| DE 60F | 4 |

Using the above formulation, but with TDI containing dissolved $CO_2$ and $CO_2$ injected into the polymer polyol feed line between the pump and the mixing chamber, a foam having a cured density of 1.62 pcf was obtained.

This example demonstrates that a significant density reduction can be obtained in formulations comprising polymer polyols by employing gaseous $CO_2$.

16. Effect of Degassing TDI Prior to Dissolving $CO_2$ in Storage Tank

A standard polyether formulation was employed in the following examples. A control foam Ex. 16A, containing no $CO_2$ was prepared using the Henneke apparatus described above and had a density of 1.15 pcf. A 60 gallon tank containing TDI was subjected to vacuum degassing for one hour to remove dissolved air, i.e., nitrogen; thereafter $CO_2$ was bubbled into the tank with mixing until saturation. Using the vacuum degassed, $CO_2$ saturated TDI, foams having densities as follows were obtained:

Ex. 16B—1.08 pcf-(TDI LP set at 30)
Ex. 16C—1.05 pcf-(TDI LP closed)

These examples demonstrate that reductions in density are improved by vacuum degassing of the TDI component prior to saturation of the TDI with $CO_2$.

In a further series of examples, the high pressure mixer manufactured by the Admiral Equipment Company described previously, was employed in the continuous casting of polyether foam of the formulation of Ex. 16A having a density of 1.14 pcf.

In two subsequent runs of Ex. 16E and 16F, TDI that had been degassed as described above was employed and both produced foam having a cured density of 1.09 pcf.

These examples demonstrate that comparable reductions in density are possible using different types of commercial foam manufacturing equipment in the practice of the embodiment of the invention which includes the degassing of the isocyanate component.

17. Effects of Additives to Increase the Solubility of $CO_2$ in the Polvol Component The following examples are illustrative of the effect of the addition of compounds not customarily incorporated in flexible polyurethane foam formulations which enhance the solubility of $CO_2$ in the reactant or component feedstream and which ultimately result in the production of a foam product having a lower density than obtained in a comparable formulation, but without the additives. The control of Ex. 17A, which includes $CO_2$ dissolved in the polyol feedstream, is prepared by incorporating the respective additive in the polyol component with thorough mixing to insure uniform distribution. The additive can be mixed with a smaller quantity of the polyol, or other solvent compatible with the foam-forming reaction and then introduced in the polyol storage tank equipped with a stirrer to facilitate uniform mixing. In the following table all ingredients are in phr.

| Component | Ex 17A | Ex 17B | Ex 17C | Ex 17D | Ex 17DE | Ex 17E |
| --- | --- | --- | --- | --- | --- | --- |
| Polyol 3140 | 100 | 95 | 96 | 97 | 95 | 95 |
| Additive | | | | | | |
| Methyl Acetylene | — | 5 | — | — | — | — |
| Hydroxylamine | — | — | 4 | — | — | — |
| Glyoxal | — | — | — | 3 | — | — |
| Butyrolactone | — | — | — | — | 5 | — |
| Caprolactam | — | — | — | — | — | 5 |
| TDI 80/20 | 61.5 | 61 | 61.1 | 60.7 | 61 | 61 |
| Q2 S160 | 1.4 | 1.4 | 1.4 | 1.4 | 1.4 | 1.4 |
| T-10 | 0.5 | 0.5 | 0.5 | 0.5 | 0.5 | 0.5 |
| H₂O | 5.2 | 5.2 | 5.2 | 5.2 | 5.2 | 5.2 |
| C232 | .06 | .06 | .06 | .06 | .06 | .06 |
| Density (pcf) | 1.15 | 1.09 | 1.06 | 1.04 | 1.03 | 1.02 |

These examples demonstrate that lower density of the cured foam results from addition of additives which have the effect of enhancing the solubility of $CO_2$ in the polyol component of the foam formulation.

18. Effect of Addition of Difunctional Graft Polyol To Increase Solubility of $CO_2$ in Polyol Component In the examples which follow a portion of the trifunctional polyol in the control of Ex 18A is replaced with a difunctional graft polyol, which has the effect of increasing the solubility of $CO_2$ in the polyol composition which in turn results in foam of reduced density. The difunctional polyol is preferably highly grafted to both increase $CO_2$ solubility and avoid the softening of the cured foam which usually occurs when difunctional additives are used. In the following examples a styrene copolymer is substituted for a portion of the polyol in the control, or comparative, Ex. 18A:

| Formulation | Quantity (phr) | | | | | | |
| --- | --- | --- | --- | --- | --- | --- | --- |
| Example | 18A | 18B | 18C | 18D | 18E | 18F | 18G |
| 15082 | 100 | 90 | 70 | 60 | 50 | 70 | 80 |
| 1055 | — | 10 | 30 | 40 | 50 | 30 | 20 |
| TDI 80/20 | 60 | 60 | 60 | 60 | 60 | 60 | 60 |
| Water | 2.4 | 2.4 | 2.4 | 2.4 | 2.4 | 2.4 | 2.4 |
| Silicone Q25160 | 1.1 | 1.1 | 1.1 | 1.1 | 1.1 | 1.1 | 1.1 |
| T-10 | 0.2 | 0.2 | 0.2 | 0.2 | 0.2 | 0.2 | 0.2 |
| C 232 | 0.04 | 0.04 | 0.04 | 0.04 | 0.04 | 0.04 | 0.04 |
| Density | 2.17 | 2.11 | 2.11 | 2.03 | 2.06 | 2.08 | 1.99 |

These examples demonstrate the effectiveness of substituting a polyether diol containing styrene copolymer for a portion of the trifunctional polyol to effect a reduction in density where $CO_2$ is added to the polyol.

19. Effect of Additives Which Decompose During Reaction to Release $CO_2$

In the following examples, the effect is demonstrated of incorporating into the foam forming reactants selected additives which decompose at the reaction temperature to generate $CO_2$ which in turn reduces the density of the foam when compared to that of a formulation without the additive.

Compounds which have utility in generating $CO_2$ upon decomposition include ammonium hydrogen carbonate and guanidine carbonate, and other organic carbonates which do not have a deleterious effect on the foam reaction.

A synergistic effect is obtained with the addition of propylene carbonate to polyether polyol whereby the solubility of $CO_2$ in the polyol is increased so that $CO_2$ in addition to that produced by the decomposition of the carbonate is available to the rising foam mass.

In a further embodiment of the invention, the gas-releasing organic carbonates are carried by salts or porous fillers which are also catalysts for the low temperature decomposition. Compounds having utility include those from the following groups:
1. Carbonates and bicarbonates of magnesium, calcium and aluminum.
2. Complex aluminates or silicates such as sodium alumina silicate clays, so called molecular sieves.
3. High surface area to volume insoluble oxides or sulfates such as $MgO$, $Al_2O_3$, $SiO_2$.
4. High surface area organic materials such as charcoal derived from animal bones and the like.

The solid materials are added to the polyol, or to a prepolymer mixture containing the polyol, in a finely divided state. If necessary, wetting agent compatible with the foam reaction can be used to insure thorough mixing of the dry materials in the polyol.

In one series of examples, hand batches were prepared as described previously in connection with Ex. 1T, 1U and 1V. A comparison of the foam density obtained using standard polyether formulation Ex. 19A, with the same formulation incorporating $CO_2$ in the polyol component Ex. 19B, and various additives and combinations of additives produced the following results:

| Example | Ex. 19A | Ex. 19B | Ex. 19C | Ex. 19D $NH_4HCO_3$ | Ex. 19E (phr) |
|---|---|---|---|---|---|
| Additive (phr) | Control | $CO_2$ | Control | 5 | 10 |
| Cured Density (pcf) | 1.32 | 1.19 | 1.25 | 1.20 | 1.11 |

These examples demonstrate the effect of density reductions obtained by incorporating $CO_2$ generating additives, and additives with carriers, in the polyol component.

20. Effect of Increasing Solubility of $CO_2$ in Polyol by Additives to Raise Polyol Viscosity In the following examples the solubility of $CO_2$ in the polyol composition is increased by the addition of viscosity-increasing compounds to the polyol while it is in the supply tank.

In the following examples, the indicated quantities (by weight) of viscosity increasing agents were added to 100 parts of a polyether polyol resin sold under the designation 3140 by Dow Chemical. The viscosity of the polyether polyol was determined at 24° C. using a No. 6 spindle and the indicated revolutions. Similarly, the viscosity of the polyol after addition and mixing of the compounds was determined.

| Sample | Parts (by wt.) | 20 RPM | 4 RPM | AGED |
|---|---|---|---|---|
| 3140 | 100 | 700 cps | 1000 cps | — |
| Glucamate DOE 120 | 5 | 4000 cps | 8500 cps | — |

Using a standard polyether foam formulation, glucamate DOE 120 (referred to in the following examples as G-DOE) was added to the polyol to increase its viscosity, first without addition of $CO_2$ and then with $CO_2$ injected into the polyol storage tank. In the final example the TDI component also contained $CO_2$ dissolved while in the storage tank.

| Example No. | G-DOE (phr) | $CO_2$ Pressure psi | Density pcf |
|---|---|---|---|
| 20A | 0 | 0 | 1.17 |
| 20B | 3.3 | 0 | 1.20 |
| 20C | 3.3 | Polyol | 1.16 |
| 20D | 8.3 | Polyol + TDI | 1.14 |

The increase in density in Ex. 20B shows the effect of adding the inert solid. The results of Ex 20D demonstrates a significant reduction in density, even after adding about 5% of inert solid.

21. Preparation of Supercritical Solutions containing Liquid $CO_2$

The following examples describe apparatus and methods for preparing supercritical solutions of liquid $CO_2$ and polyurethane foam reactants and components which permit the inclusion of essentially unlimited amounts of $CO_2$ into the foaming mass at the initial stages of the reaction.

EXAMPLE 21A

A heated pressure vessel with a mixer is employed to prepare a solution of 100 pounds of polyether polyol and 5 to 30 pounds of $CO_2$ at a temperature in the range from 90°–110° F. and a pressure of from 1000 to 1250 psi. The solution from the pressure vessel is delivered to a high pressure mixing head adapted for this purpose from equipment conventionally employed in rigid injection molding of polyurethanes and in the spraying of polyurethane foam. The liquid material is introduced to the mixing head at a pressure exceeding 1000 psi. The other foam forming constituents are introduced into the mixing head through separate lines where they are mixed at a pressure exceeding 1000 psi and discharged onto a conventional casting conveyor system where it completed its rise.

The cured foam is of good quality and exhibits a density which is at least 10–15% lower than that of foam produced in the conventional manner and without the addition of $CO_2$ from a comparable formulation.

EXAMPLE 21B

The same pressure vessel and apparatus described in Example A is employed to mix 40 pounds of TDI 80/20 and 5 to 30 pounds of $CO_2$, which is then introduced into the mixing head and mixed with the other foam forming constituents at a pressure exceeding 1000 psi. The foam is discharged onto the moving surface of the casting conveyor where it completes its rise.

The cured foam is of good quality and exhibits a density which is at least 10–15% lower than that of foam produced from a comparable formulation in the conventional manner and without the addition of $CO_2$.

EXAMPLE 21C

Employing conventional foam making equipment and a standard formulation for the production of a polyurethane foam by the reaction of a polyol with TDI, all foam making constituents except TDI are mixed with the polyol and water in a high pressure vessel equipped with a mixer. The following ingredients are introduced into a high pressure mixing head in at least three separate streams in the proportions indicated:

1. The polyol resin blend of foam forming ingredients;
2. TDI with an index of 90-120 in a quantity calculated to react with the water in the polyol resin blend of ingredients; and
3. $CO_2$ at a temperature of about 90° F. and at least 1000 psi, and in an amount which equals from 1 to 15 parts per 100 parts of the polyol in the resin blend.

After mixing, the foam forming composition is discharged from the mixing head and poured on to a moving conveyor where it completes its rise. The cured foam is of good quality and exhibits a density which is at least 10-15% lower than that of foam produced from a comparable formulation in the conventional manner, and without the addition of $CO_2$.

We claim:

1. In the method for the continuous manufacture of flexible free rise polyurethane foam from reactants comprising at least one polyol and at least one reactive isocyanate where the reaction mixture includes water as a blowing agent and $CO_2$ is incorporated into one of the liquid reactants, or into a blend of one or more of the liquid reactants, and the reactants are introduced under pressure through feed lines into a conventional mixer through two or more feed streams, and the reacting mixture is discharged from the mixer, the improvement which comprises:

injecting gaseous $CO_2$ under pressure into the feed stream of one or more of the liquid reactants of the foam forming composition at a distance from the mixer which will maximize the dissolution of $CO_2$ in the feed stream.

2. The method of claim 1 where each of the liquid reactants streams are pressurized by a metering pump for delivery to the mixer, and the $CO_2$ is injected into the reactant feed line downstream of the pump.

3. The method of claim 1 where the feed stream containing the injected $CO_2$ passes through a static mixing zone.

4. The method of claim 3 where the static mixing zone is upstream of the mixer.

5. In the method of claim 1, the improvement which further comprises reducing the temperature of the liquid reactant into which the $CO_2$ is injected to less than ambient temperature to thereby increase the solubility of the $CO_2$ in the reactant.

6. The method of claim 5 in which the temperature of the liquid reactant into which the $CO_2$ is injected is in the range of 45° F. to 60° F.

7. The method of claim 1, where the $CO_2$ is introduced into liquid reactant comprising polyol.

8. The method of claim 7 where the liquid reactant also contains a silicone emulsifier.

9. The method of claim 7 where the liquid reactant further includes the reactive isocyanate compound.

10. The method of claim 7 where the polyol is selected from the group consisting of branched side chain polyols, ACN and styrene grafted copolymer.

11. The method of claim 1, where the $CO_2$ is introduced into the isocyanate reactant feedstream.

12. In the method for the continuous manufacture of flexible polyurethane foam in conventional apparatus from the reaction of at least one polyol with at least one isocyanate where the reaction includes water as a blowing agent and $CO_2$ is incorporated into the polyol containing liquid component and the polyol and isocyanate reactants are introduced into a mixer as separate feedstreams and the reacting mixture is discharged from the mixer, the improvement which comprises injecting $CO_2$ under pressure into the polyol feedstream and the isocyanate feedstream at a distance that will maximize the dissolution of the $CO_2$ in the polyol and isocyanate.

13. The method of claim 12 in which the rate of a $CO_2$ injection is sufficient to saturate the feed stream comprising the reactant.

14. The method of claims 1 or 12 in which gaseous $CO_2$ is introduced into the storage vessels for one or more of the foam forming ingredients.

15. The method of claims 1 or 12 in which $CO_2$ is bubbled through the polyol reactant contained in a storage vessel until the polyol is saturated with $CO_2$.

16. The method of claim 15 in which the polyol is a polyester polyol.

17. The method of claim 15 in which the polyol is a polyether polyol.

18. The method of claims 1 or 12 in which $CO_2$ is bubbled through the polyol and polyisocyanate reactants contained in storage vessels until said reactants are saturated with $CO_2$.

19. The method of claim 18 where the liquid reactant is stirred during contact with the $CO_2$ gas.

20. The method of claims 1 or 12 in which an atmosphere of gaseous $CO_2$ is maintained in the storage vessel containing the polyol reactant.

21. The method of claim 20 in which the atmosphere of $CO_2$ above the liquid reactants is at a pressure of 15 psi to 100 psi.

22. The method of claim 21 where the pressure of the $CO_2$ in the storage vessel is from 30 psi to 80 psi.

23. The method of claims 1 or 12 where the liquid reactants are subjected to vacuum degassing to remove dissolved gasses prior to being contacted with $CO_2$.

24. The method of claims 1 or 12 in which one or more of the liquid reactants are maintained at a temperature in the range from 40° to 60° F.

25. The method of claims 1 or 12 in which the temperature of the foam-forming reaction is increased following its discharge from the mixer by an external heat source to accelerate the foaming reaction.

26. The method of claims 1 or 12 in which the polyol reactant comprises a difunctional graft polyol.

27. The method of claims 1 or 12 in which a portion of the polyol reactant comprises a graft polyether diol where the copolymer is selected from the group consisting of styrene and acrylonitrile.

28. The method of claim 25 in which the diol comprises from 5% to 95% of the total poyol reactant mixture.

29. The method of claims 1 or 12 in which the polyol is a polyether polyol containing a silicone emulsifier of the type employed in the manufacture of polyurethane foam.

30. The method of claims 1 or 12 in which the solubility of $CO_2$ in the liquid reactants is increased by the addition to the polyol of a compound, or mixture of compounds, selected from the group consisting of:
    (a) methyl acetylene
    (b) hydroxyl amine
    (c) glyoxal
    (d) butyrolactone
    (e) caprolactam 31. The method of claim 30 where the compound, or mixture of compounds, is present in the polyol in the range of from at least 3 phr to 5 phr.

32. The method of claims 1 or 12 in which the polyol reactant further comprises a compound, or mixtures of $CO_2$ generating compounds, selected from the group consisting of:
   (a) low molecular weight organic carbonates including ethylene carbonate and propylene carbonate; and
   (b) ammonium hydrogen carbonate and guanidine carbonate.

33. The method of claim 32 in which the $CO_2$ generating compounds are incorporated into the polyol reactant with a compound, or a mixture of compounds which accelerate the decomposition of the $CO_2$ generating compounds, selected from the group consisting of:
   (a) carbonates and bicarbonates of magnesium, calcium and aluminum;
   (b) sodium alumina silicate clays;
   (c) $MgO$, $Al_2O_3$ and $SiO_2$ in the form of solids having a high surface area to volume ratio; and
   (d) charcoal derived from sources providing a high surface area to volume ratio.

34. The method of claims 1 or 12 in which the polyol reactant comprises a mixture of a polyether polyol and a nonionic sugar derivative to increase the viscosity of the polyol.

35. The method of claim 34 in which the nonionic sugar derivative is polyethylene glycol 120 methyl glucose dioleate.

36. In the method for the continuous manufacture of polyurethane foam from reactants comprising at least one polyol and at least one isocyanate where the reaction mixture includes water as a blowing agent and $CO_2$ is incorporated into at least one of the liquid reactants, the improvement which comprises adding $CO_2$ as a supercritical fluid constituent to one or more of the liquid reactants comprising polyol and isocyanate which are maintained at a temperature of at least 88° F., at a pressure of at least 1073 psi, and mixing the liquid reactants, and discharging the mixed foam-forming reactants at atmospheric pressure.

* * * * *

UNITED STATES PATENT AND TRADEMARK OFFICE
CERTIFICATE OF CORRECTION

PATENT NO. : 4,906,672
DATED : March 6, 1990
INVENTOR(S) : Herman Stone et al.

It is certified that error appears in the above-identified patent and that said Letters Patent is hereby corrected as shown below:

Col. 3, line 30, "U.S. Pat. No" should be --U.S. Pat. No.--
Col. 9, line 29, "blow" should be --blown--
Col. 10, line 30, "Polvols" should be --Polyols--
Col. 10, line 44, "E646A" should be --E646 - A--
Col. 13, lines 18 & 34, "Polvol" should be --Polyol--
Col. 14, line 9, "atomizing-nozzle" should be --atomizing nozzle--
Col. 19, line 6, "Q2510" should be --Q25160-- (table)
Col. 19, line 53, "Polvol" should be --Polyol--
Col. 20, lines 30 & 34, "CO2" should be --$CO_2$--
Col. 21, line 46, "Polvol" should be --Polyol--
Col. 22, line 44, "completed" should be --completes--
Col. 23, line 61, "claim 1,." should be --claim 1,--
Col. 24, line 1, "feedstreams" should be --feedstreams,--
Col. 26, line 18, "F.," should be --F.--

UNITED STATES PATENT AND TRADEMARK OFFICE
CERTIFICATE OF CORRECTION

PATENT NO. : 4,906,672

DATED : March 6, 1990

INVENTOR(S) : Herman Stone, et al

It is certified that error appears in the above-identified patent and that said Letters Patent is hereby corrected as shown below:

Col. 26, line 19, "at" should be --and--

Col. 26, line 20, "reactants," should be --reactants--

Signed and Sealed this

Sixteenth Day of July, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. :   4,906,672

DATED     :   March 6, 1990

INVENTOR(S) :   Herman Stone et al.

It is certified that error appears in the above-identified patent and that said Letters Patent is hereby corrected as shown below:

```
Col. 5, line 57, after "75" insert --to--
Col. 11, line 7, "stanous" should be --stannous--
Col. 20, line 15, "Q2S160" should be --Q25160--
Col. 24, line 54 "poyol" should be --polyol--.
```

Signed and Sealed this

Thirteenth Day of August, 1991

Attest:

HARRY F. MANBECK, JR.

*Attesting Officer*   *Commissioner of Patents and Trademarks*